US010288785B2

(12) United States Patent
Kwon et al.

(10) Patent No.: US 10,288,785 B2
(45) Date of Patent: May 14, 2019

(54) METHOD OF MANUFACTURING COLOR FILTER SUBSTRATE AND METHOD OF MANUFACTURING DISPLAY DEVICE BY USING THE SAME

(71) Applicant: SAMSUNG DISPLAY CO., LTD., Yongin-si, Gyeonggi-do (KR)

(72) Inventors: Jaejoong Kwon, Yongin-si (KR); Hoikwan Lee, Yongin-si (KR); Yunseon Do, Yongin-si (KR); Chio Cho, Yongin-si (KR); Hyesog Lee, Yongin-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 173 days.

(21) Appl. No.: 15/196,620

(22) Filed: Jun. 29, 2016

(65) Prior Publication Data
US 2017/0059752 A1    Mar. 2, 2017

(30) Foreign Application Priority Data

Aug. 31, 2015 (KR) .......................... 10-2015-0122872

(51) Int. Cl.
*G02B 5/20* (2006.01)
*B32B 37/12* (2006.01)
*B32B 37/14* (2006.01)

(52) U.S. Cl.
CPC .............. *G02B 5/201* (2013.01); *B32B 37/12* (2013.01); *B32B 37/14* (2013.01); *B32B 2307/40* (2013.01); *B32B 2307/412* (2013.01)

(58) Field of Classification Search
CPC ......... G02B 5/201; B32B 37/12; B32B 37/14; Y10T 156/1052; Y10T 156/1057
See application file for complete search history.

(56) References Cited

U.S. PATENT DOCUMENTS

| 5,638,198 A * | 6/1997 | Crossley ................ G02B 5/201 |
| | | 349/104 |
| 2009/0304340 A1 * | 12/2009 | Taghizadeh ............ B82Y 20/00 |
| | | 385/115 |
| 2010/0104869 A1 | 4/2010 | Borrelli |
| 2012/0195554 A1 | 8/2012 | Maack |
| 2013/0298380 A1 | 11/2013 | Mukasa |
| 2015/0192739 A1 | 7/2015 | Miller |

FOREIGN PATENT DOCUMENTS

JP          2013127503 A       6/2013

* cited by examiner

*Primary Examiner* — Mark A Osele
*Assistant Examiner* — Christopher C Caillouet
(74) *Attorney, Agent, or Firm* — Cantor Colburn LLP

(57) ABSTRACT

A method of manufacturing a color filter substrate includes: forming a plurality of first members, a plurality of second members and a plurality of third members, where each of the first members, the second members and the third members has a pillar shape extending in a direction; stacking the first members, the second members and the third members on one another; forming a preform by inserting the stacked first members, second members, and third members into a cane; forming a stick member from the preform via a drawing process by applying heat to the preform inserted into the cane; and slicing the stick member.

20 Claims, 13 Drawing Sheets

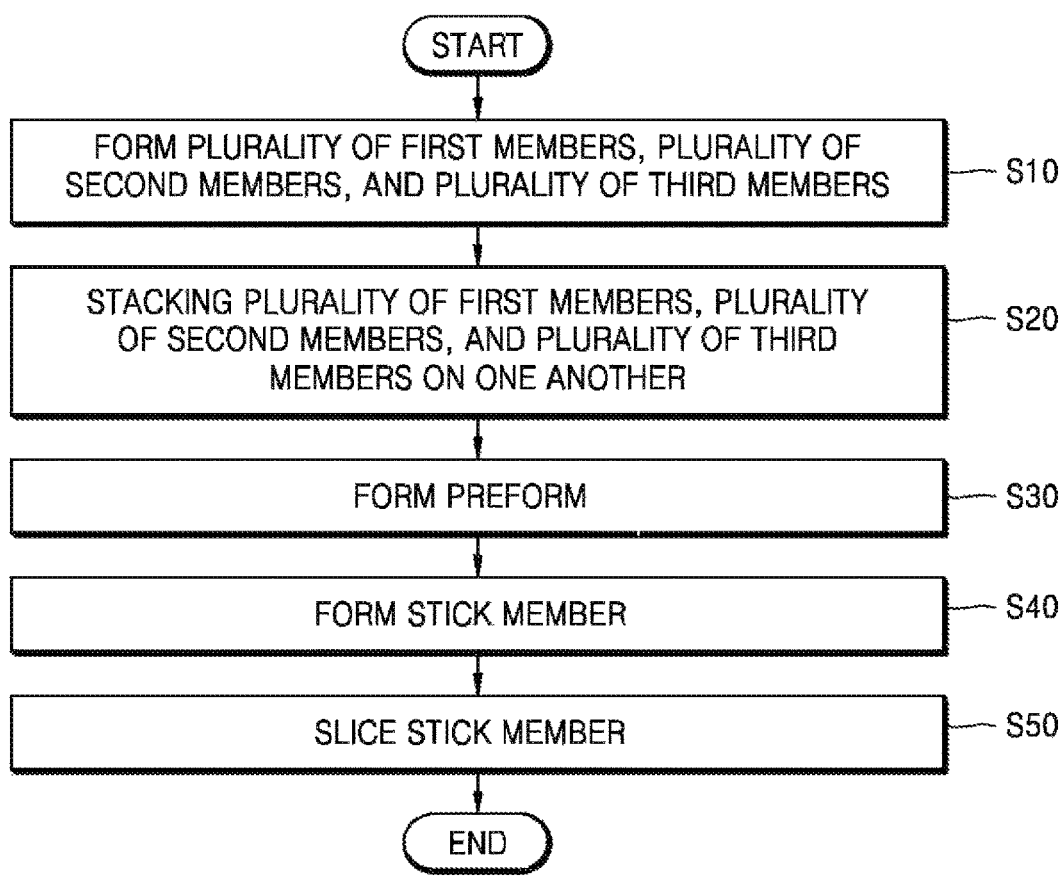

METHOD OF MANUFACTURING COLOR FILTER SUBSTRATE AND METHOD OF MANUFACTURING DISPLAY DEVICE BY USING THE SAME

CROSS-REFERENCE TO RELATED APPLICATION

This application claims priority to Korean Patent Application No. 10-2015-0122872, filed on Aug. 31, 2015, and all the benefits accruing therefrom under 35 U.S.C. § 119, the content of which in its entirety is herein incorporated by reference.

BACKGROUND

1. Field

One or more exemplary embodiments relate to a method of manufacturing a color filter substrate and a method of manufacturing a display device by using the color filter substrate, and more particularly, to a method of manufacturing a color filter substrate applicable to high resolution and a method of manufacturing a display device by using the color filter substrate.

2. Description of the Related Art

A light-emitting diode ("LED") is a device that converts an electric signal to light such as infrared rays, visible light, etc. by using characteristics of a compound semiconductor. The LED is widely used for home appliances, a remote controller, an electronic board, various kinds of automation apparatuses, etc. Recently, the LED is utilized in a wide range of fields of an electronic device from a miniaturized hand-held electronic device to a large-scale display device, and a use range of the LED is gradually extending.

In such an electronic device including the LED, a color filter substrate is provided to a display device to which the LED is applied to easily produce colors. The color filter substrate may be manufactured by using photolithography on a thin film substrate.

SUMMARY

However, according to a conventional method of manufacturing a color filter substrate and method of manufacturing a display device by using the color filter substrate, since many stages of patterning processes are used in a photolithography technique, a manufacturing time is long, and a process operation is complicated, and thus, is not suitable for being applied to high resolution.

One or more exemplary embodiments include a method of manufacturing a color filter substrate and a method of manufacturing a display device by using the color filter substrate. However, this object is exemplary and the scope of the inventive concept is not limited thereto.

According to one or more exemplary embodiments, a method of manufacturing a color filter substrate includes: forming a plurality of first members, a plurality of second members, and a plurality of third members, where each of the first members, the second members and the third members has a pillar shape extending in a direction; stacking the first members, the second members and the third members on one another; forming a preform by inserting the stacked first members, second members and third members into a cane; forming a stick member from the preform via a drawing process by applying heat to the preform inserted into the cane; and slicing the stick member.

In an exemplary embodiment, each of the first members, the second members and the third members may include a glass material.

In an exemplary embodiment, each of the first members, the second members and the third members may include a plastic material.

In an exemplary embodiment, the cane may include the same material as those of the first members, the second members, and the third members.

In an exemplary embodiment, each of the first members may include a first core having a first color at a center thereof and a first light-shielding portion surrounding the first core, each of the second members may include a second core having a second color at a center thereof and a second light-shielding portion surrounding the second core, and each of the third members may include a third core having a third color at a center thereof and a third light-shielding portion surrounding the third core.

In an exemplary embodiment, the first color may be a red color, the second color may be a green color, and the third color may be a blue color.

In an exemplary embodiment, the forming the first members, the second members and the third members may include: forming each of the first members, the second members and the third members via a drawing process.

In an exemplary embodiment, the first members, the second members and the third members in the preform may be regularly arranged.

In an exemplary embodiment, each of the first members, the second members and the third members may have a circular, elliptical, or polygonal cross-section.

In an exemplary embodiment, the preform may have a circular, elliptical, or polygonal cross-section.

In an exemplary embodiment, the cane may have a circular, elliptical, or polygonal cross-section corresponding to a shape of the preform.

In an exemplary embodiment, the first members, the second members, the third members and the cane may have a same coefficient of thermal expansion as each other.

In an exemplary embodiment, the forming of the stick member may include: reducing a cross-section of the preform by a predetermined degree by extending the preform in a direction.

In an exemplary embodiment, the color filter substrate may have a circular, elliptical, or polygonal shape.

According to one or more exemplary embodiments, a method of manufacturing a display device includes: manufacturing the color filter substrate by using the manufacturing method thereof as described above; preparing a substrate having a display area and a peripheral area around the display area; forming a display portion in the display area of the substrate; and disposing the color filter substrate on the substrate in a way such that the color filter substrate faces the substrate with the display portion disposed therebetween.

In an exemplary embodiment, the disposing the color filter substrate may include: bonding the color filter substrate and the display portion together with a transparent adhesive layer disposed between the color filter substrate and the display portion.

In an exemplary embodiment, the disposing the color filter substrate may include: bonding the color filter substrate and the display portion together by providing a sealing member therebetween in the peripheral area.

In an exemplary embodiment, the color filter substrate may include a plurality of red color filters, a plurality of green color filters, and a plurality of blue color filters, and the red color filters may include a same material as a material of the first cores, the green color filters may include a same material as a material of the second cores, and the blue color filters may include a same material as a material of the third cores.

In an exemplary embodiment, the display portion may include a plurality of first pixels, a plurality of second pixels and a plurality of third pixels, the first pixels may respectively correspond to the red color filters, the second pixels may respectively correspond to the green color filters, and the third pixels may respectively correspond to the blue color filters.

In an exemplary embodiment, a black matrix may be disposed between the plurality of red color filters, the plurality of green color filters and the plurality of blue color filters, and the black matrix may include a same material as a material of a light-shielding portion.

As described above, according to an exemplary embodiment, a method of manufacturing a color filter substrate applicable to high resolution and a method of manufacturing a display device by using the color filter substrate may be implemented. As understood by those of ordinary skill in the art, the scope of the inventive concept is not limited by this effect.

BRIEF DESCRIPTION OF THE DRAWINGS

These and/or other aspects and features of the embodiments of the invention will become apparent and more readily appreciated from the following description of the exemplary embodiments, taken in conjunction with the accompanying drawings, in which:

FIG. 1 is a flowchart illustrating a method of manufacturing a color filter substrate according to an exemplary embodiment;

DETAILED DESCRIPTION

Figure 2A:
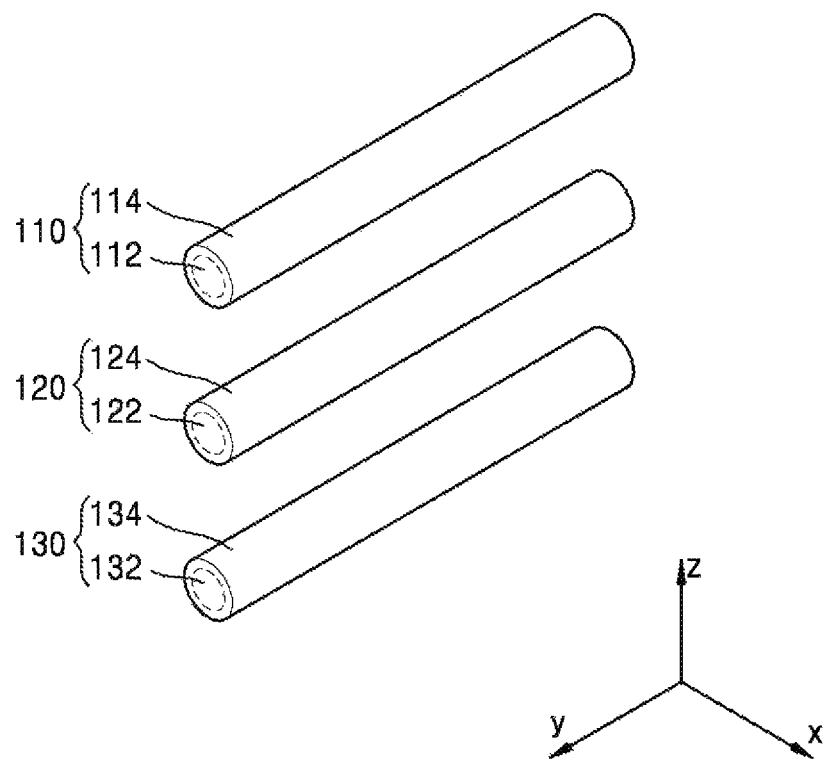
FIGS. 2A to 2E are schematic conceptual diagrams illustrating a manufacturing process according to an exemplary embodiment.

As the inventive concept allows for various changes and numerous embodiments, exemplary embodiments will be illustrated in the drawings and described in detail in the written description. Effects and characteristics of present exemplary embodiments, and a method of accomplishing them will be apparent by referring to content described below in detail together with the drawings. However, the present exemplary embodiments are not limited to exemplary embodiments below and may be implemented in various forms.

Hereinafter, the inventive concept will be described more fully with reference to the accompanying drawings, in which exemplary embodiments of the inventive concept are shown. When description is made with reference to the drawings, like reference numerals in the drawings denote like or corresponding elements, and repeated description thereof will be omitted.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Or" means "and/or." As used herein, the term "and/or" includes any and all combinations of one or more of the associated listed items.

Expressions such as "at least one of" when preceding a list of elements, modify the entire list of elements and do not modify the individual elements of the list.

It will be understood that although the terms "first", "second", etc. may be used herein to describe various components, these components should not be limited by these terms. These components are only used to distinguish one component from another. As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components. It will be understood that when a layer, region, or component is referred to as being "formed on," another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of explanation, the following embodiments are not limited thereto.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Herein, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Hereinafter, exemplary embodiments of the invention will be described in detail with reference to the accompanying drawings.

FIG. 1 is a flowchart illustrating a method of manufacturing a color filter substrate according to an exemplary embodiment.

Referring to FIG. 1, an exemplary embodiment of the method of manufacturing the color filter substrate includes: forming a plurality of first members, a plurality of second members, and a plurality of third members (S10), disposing, e.g., stacking, the plurality of first members, the plurality of second members and the plurality of third members (S20) on one another, forming a preform (S30), forming a stick member (S40), and slicing the stick member (S50).

In an exemplary embodiment, an operation S10 of forming the plurality of first members, the plurality of second members and the plurality of third members may be performed. In such an embodiment, each of the plurality of first members, the plurality of second members and the plurality of third members may be formed in a pillar shape. In such an embodiment, each of the plurality of first members, the plurality of second members, and the plurality of third members may have a pillar shape extending in a longitudinal direction and having a long side and a short side.

Each of the plurality of first members, the plurality of second members, and the plurality of third members may have a predetermined cross-section, for example, a circular, elliptical, or polygonal cross-section. In such an embodiment, each of the plurality of first members, the plurality of second members and the plurality of third members may have a shape of a cylinder, a cylindroid, or a polygonal pillar. Each of the plurality of first members, the plurality of second members and the plurality of third members may have the same shape as each other, or the plurality of first members, the plurality of second members and the plurality of third members may have different shapes from each other.

Each of the plurality of first members, the plurality of second members and the plurality of third members may define a color filter pattern corresponding to a pixel. Therefore, each of the plurality of first members, the plurality of second members and the plurality of third members may have a cross-section having a shape of a pixel corresponding thereto in the display portion.

The plurality of first members, the plurality of second members and the plurality of third members may include, for example, a material such as glass, and include a plastic material such as polymethyl methacrylate ("PMMA"), polycarbonate ("PC"), polyethylene ("PE"), and polypropylene ("PP"), but not being limited thereto and may include various materials. The plurality of first members, the plurality of second members and the plurality of third members may include a transparent or semi-transparent material that may transmit light therethrough.

In an exemplary embodiment, each of the plurality of first members may include a first core at a center thereof and a first light-shielding portion surrounding the first core. In such an embodiment, each of the plurality of second members may include a second core at a center thereof and a second light-shielding portion surrounding the second core, and each of the plurality of third members may include a third core at a center thereof and a third light-shielding portion surrounding the third core.

The first core, the second core and the third core may have a first color, a second color and a third color, respectively. In one exemplary embodiment, for example, the first color may be a red color, the second color may be a green color, and the third color may be a blue color. However, the inventive concept is not limited thereto and the first core, the second core and the third core may have a white color or various colors according to an exemplary embodiment.

The first, second and third light-shielding portions may surround the first, second and third cores, respectively. The first, second and third light-shielding portions may include, for example, a black material, and may function like a black matrix. The first, second and third light-shielding portions may include the same material as those of the first, second and third cores.

In an exemplary embodiment, the plurality of first members, the plurality of second members and the plurality of third members may be formed by using a drawing process described below with reference to FIGS. 5A and 5B.

In an exemplary embodiment, an operation S20 of disposing or stacking the plurality of first members, the plurality of second members and the plurality of third members on one another may be performed. The stacked plurality of first members, plurality of second members, and plurality of third members may define a bundle and may be arranged regularly in the bundle. The stacking may be implemented in various shapes, and the plurality of first members, the plurality of second members and the plurality of third members may be collected at a place and arranged regularly. In such an embodiment, the regularly arranging may be arranging the cross-sections of the plurality of first members, the plurality of second members, and the plurality of third members along alignment configurations of pixels.

In an exemplary embodiment, an operation S30 of forming a preform may be performed by inserting the stacked plurality of first members, plurality of second members, and plurality of third members into a cane. The preform denotes a shape before the drawing process and may be formed by inserting the plurality of first members, the plurality of second members and the plurality of third members into the cane. Since the preform is formed by collecting the plurality of first members, the plurality of second members, and the plurality of third members, the preform may have a pillar shape like the first, second, and third members. The cross-section of the preform may have various shapes depending on the arrangement in which the plurality of first members, the plurality of second members and the plurality of third members are disposed, and have, for example, a circular, elliptical, or polygonal shape.

Herein, the cane means a cane-like structure or a member having a tube-like shape including an empty space to allow the preform to be inserted into the empty space thereof. The cane may include the same material as those of the plurality of first members, the plurality of second members and the plurality of third members that form the preform. Therefore, the cane may include, for example, a material such as glass, and include a plastic material such as PMMA, PC, PE, and PP.

According to an alternative exemplary embodiment, the cane may include a material different from those of the plurality of first members, the plurality of second members, and the plurality of third members. However, in such an embodiment, heat may be applied to the preform inserted into the cane and thus the preform and the cane are extended together during the drawing process which will be described later. In such an embodiment, the cane and the preform include materials having the same coefficient of thermal expansion as each other.

In an exemplary embodiment, an operation S40 of forming a stick member from the preform via the drawing process may be performed. The drawing process is a processing method of transforming metal to make a linear element or a slender tube and is also referred to as a pull-out process. The drawing process may be an operation of drawing the preform as a linear element by extending the preform of a predetermined thickness via a mold referred to as a die.

The preform that has undergone the drawing process is referred to as a stick member. The length of the stick member may increase in a direction depending on a drawn degree. In an exemplary embodiment, the length of the stick member may increase compared with the preform, but the cross-section shape of the stick member may be the same as that of the preform before the drawing process. Therefore, according to an exemplary embodiment, the cross-section shape of the stick member may have the same shape as that of the preform with only a reduced ratio via the drawing process that elongates the preform. To draw the preform, an operation of applying heat to the preform may be performed. In such an embodiment, a cane into which the preform is inserted is located inside a furnace, and then heat may be applied to the cane.

In an exemplary embodiment, an operation S50 of slicing the stick member may be performed. A color filter substrate may be formed by slicing the stick member. The color filter substrate may have the shape of the cross-section of the preform. Therefore, the color filter substrate may also have a circular, elliptical, or polygonal shape like the preform.

The color filter substrate may have a plurality of red color filter patterns, a plurality of green color filter patterns, and a plurality of blue color filter patterns. The plurality of red color filter patterns may include the same material as those of the first members, the plurality of green color filter patterns may include the same material as those of the second members, and the plurality of blue color filter patterns may include the same material as those of the third members. In such an embodiment, a portion of the first member may form the red color filter pattern, a portion of the second member may form the green color filter pattern, and a portion of the third member may form the blue color filter pattern.

After the operation S50 of slicing the stick member, polishing and other processing processes of processing the color filter substrate may be performed so that the color filter substrate may be suitable for being applied to a display device. The color filter substrate that has undergone the polishing and other processing processes may be finally applied to various display devices. The sliced color filter substrate may be processed in various sizes and shapes via the processing processes.

FIGS. 2A to 2E are schematic conceptual diagrams illustrating a manufacturing process according to an exemplary embodiment.

Referring to FIG. 2A, according to an exemplary embodiment, an operation of forming a first member 110, a second member 120, and a third member 130 may be performed to manufacture a color filter substrate. The first member 110, the second member 120, and the third member 130 may have a pillar shape extending in a direction. Though FIG. 2A illustrates an exemplary embodiment, where each of the first member 110, the second member 120, and the third member 130 have pillar shapes, but not being limited thereto.

The cross-section of the first member 110, the second member 120, and the third member 130 may have at least one of various shapes, for example, a circular, elliptical, or polygonal shape. In such an embodiment, the first member 110, the second member 120 and the third member 130 may have a shape of a cylinder, a cylindroid, or a polygonal pillar depending on the shape of the cross-section. The first member 110, the second member 120, and the third member 130 may have the same shape as each other, or may have different shapes from each other.

Each of the first member 110, the second member 120 and the third member 130 may be disposed to correspond to a pixel. In such an embodiment, the first member 110, the second member 120 and the third member 130 may have cross-sections having shapes of pixels corresponding thereto in the display portion.

The first member 110, the second member 120, and the third member 130 may include, for example, a material such as glass, and include a plastic material such as PMMA, PC, PE, and PP. However, they are not limited thereto and may include various materials. The first member 110, the second member 120, and the third member 130 may include a transparent or semi-transparent material that may transmit light therethrough.

In an exemplary embodiment, the first member 110 may include a first core 112 extending along a longitudinal direction at a center thereof and a first light-shielding portion 114 surrounding the first core 112. In such an embodiment, the second member 120 may include a second core 122 extending along a longitudinal direction at a center thereof and a second light-shielding portion 124 surrounding the second core 122. The third member 130 may include a third core 132 extending along a longitudinal direction at a center thereof and a third light-shielding portion 134 surrounding the third core 132.

The first core 112, the second core 122, and the third core 132 may respectively have a first color, a second color, and a third color. In one exemplary embodiment, for example, the first color may be a red color, the second color may be a green color, and the third color may be a blue color. However, the inventive concept is not limited thereto and the first core 112, the second core 122, and the third core 132 may have a white color or various colors according to an exemplary embodiment.

The first, second and third light-shielding portions 114, 124 and 134 may surround the first, second and third cores 112, 122 and 132, respectively. The first, second and third light-shielding portions 114, 124 and 134 may include, for example, a black material, and may function like a black matrix. The first, second and third light-shielding portions 114, 124 and 134 may include the same material as those of the first, second and third cores 112, 122 and 132.

A plurality of first members 110, a plurality of second members 120, and a plurality of third members 130 may be formed by using a drawing process. FIG. 2A exemplary illustrates only one first member 110, one second member 120, and one third member 130, but the first member 110, the second member 120 and the third member 130 may be formed in plural for implementation in an present exemplary embodiment.

Figure 2B:
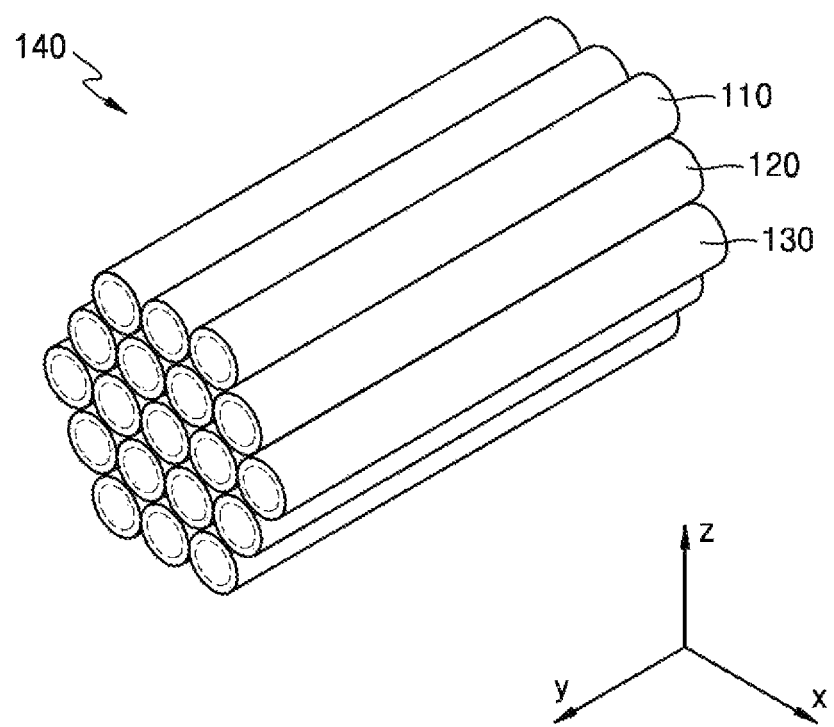

Referring to FIG. 2B, in an exemplary embodiment, an operation of stacking the plurality of first members 110, the plurality of second members 120, and the plurality of third members 130 on one another may be performed. The stacked plurality of first members 110, plurality of second members 120, and plurality of third members 130 may form one bundle 140 and may be arranged regularly in the bundle 140. The shape of the bundle 140 may be implemented variously, and the plurality of first members 110, the plurality of second members 120, and the plurality of third members 130 may be collected and arranged regularly. In such an embodiment, the regularly arranging may be arranging the cross-sections of the plurality of first members 110, the plurality of second members 120, and the plurality of third members 130 along alignment configurations of pixels.

The bundle 140 may have a shape in which the first member 110, the second member 120 and the third member 130 are disposed along a direction perpendicular to a longitudinal direction thereof, e.g., (x-axis direction or z-axis direction). In such an embodiment, the second member 120 is disposed on the third member 130, and the first member 110 is disposed on the second member 120 as illustrated in FIG. 2B, but is not limited thereto.

Figure 2C:
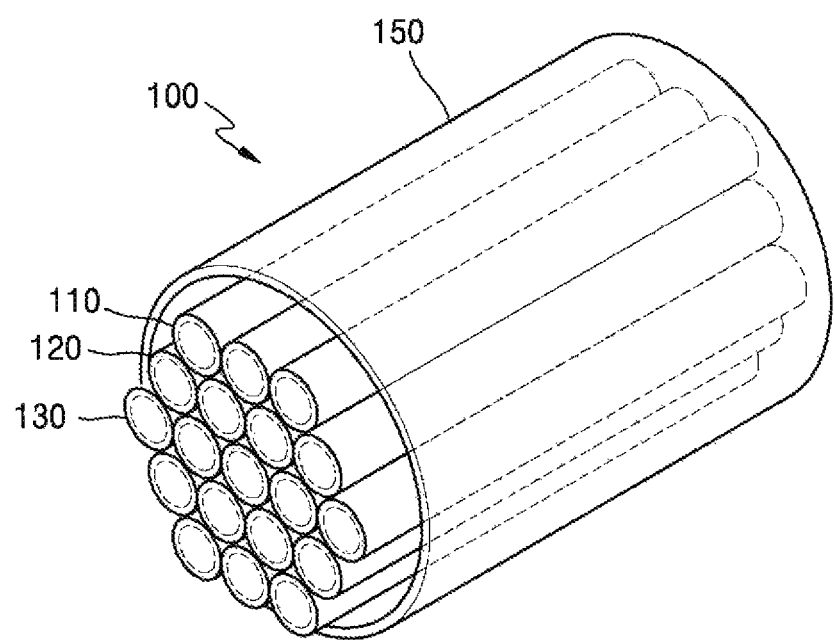

Referring to FIG. 2C, an operation of forming a preform 100 may be performed by inserting the bundle 140 including the plurality of first members 110, the plurality of second members 120 and the plurality of third members 130 into a cane 150. The preform 100 denotes a shape before the drawing process. Since the preform 100 is formed by collecting the plurality of first members 110, the plurality of second members 120, and the plurality of third members 130, the preform may have a pillar shape like the first, second, and third members 110, 120, and 130. The cross-section of the preform 100 may have various shapes depending on the arrangement in which the plurality of first members 110, the plurality of second members 120, and the plurality of third members 130 are disposed, and have, for example, a circular, elliptical, or polygonal shape.

The cane 150 is a member having a tube-like shape including an empty space, and the preform 100 may be inserted into the empty space of the cane 150. The cane 150 may include the same material as those of the plurality of first members 110, the plurality of second members 120, and the plurality of third members 130 that form the preform 100. Therefore, the cane 150 may include, for example, a material such as glass, and include a plastic material such as RAMA, PC, PE, and PP.

According to an alternative exemplary embodiment, the cane 150 may include a material different from those of the plurality of first members 110, the plurality of second members 120, and the plurality of third members 130. However, in such an embodiment, since heat is applied to the preform 100 inserted into the cane 150 and thus the preform 100 and the cane 150 are extended together during the drawing process which will be described later, the cane 150 and the preform 100 include materials having substantially the same coefficient of thermal expansion as each other.

Figure 2D:
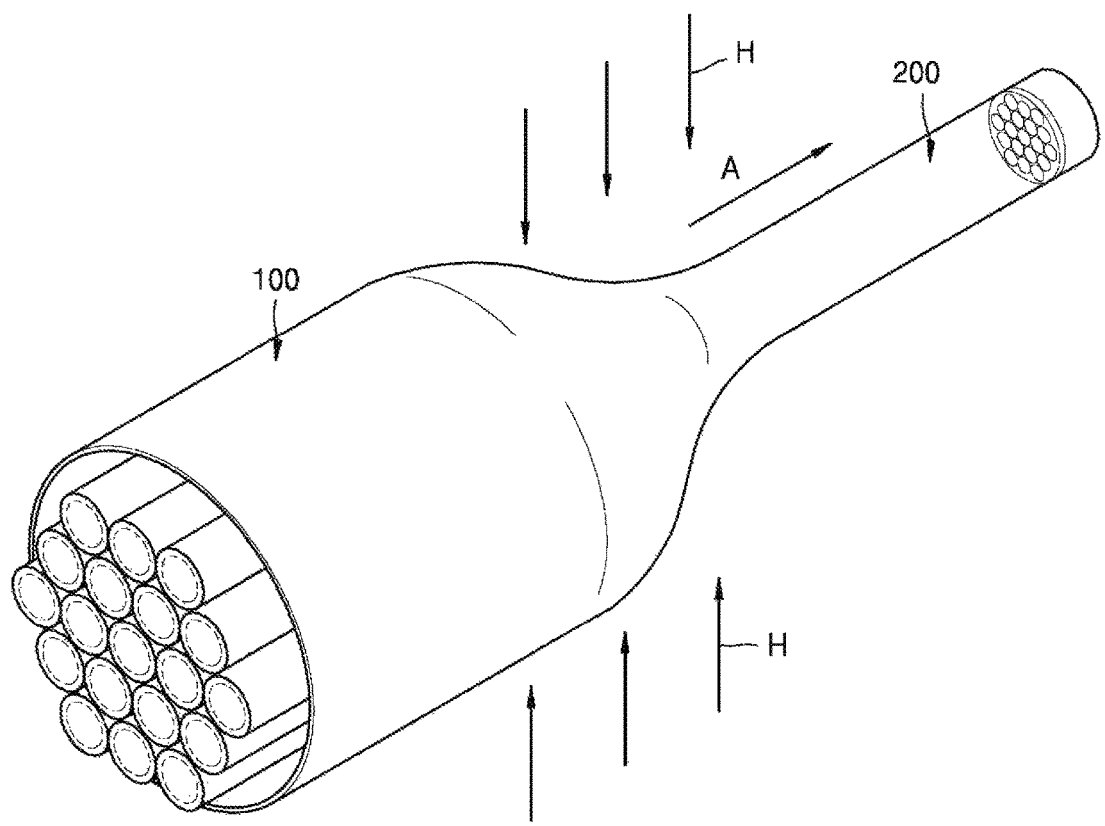

Referring to FIG. 2D, an operation of forming a stick member 200 via the drawing process may be performed. The drawing process denotes a processing method of making a linear element or a slender tube and is also referred to as a pull-out process. The drawing process denotes an operation of drawing the preform 100 as a linear element by extending the preform 100 of a predetermined thickness via a mold referred to as a die.

The preform 100 that has undergone the drawing process is referred to as a stick member 200. The length of the stick member 200 may increase in a drawing direction ("A" direction) depending on a drawn degree. In an exemplary embodiment, the length of the stick member 200 may increase compared with the preform 100, but the cross-section shape of the stick member 200 may be the same as that of the preform 100 before the drawing process. Therefore, in an exemplary embodiment, a cross-section shape of the stick member may have the same shape as that of the preform with only a reduced ratio via the drawing process that elongates the preform 100. To draw the preform 100, an operation of applying heat H to the preform 100 may be performed. In such an embodiment, the cane 150 into which the preform 100 is inserted is located inside a furnace (not shown), and then heat H may be applied to the cane 150.

Figure 2E:
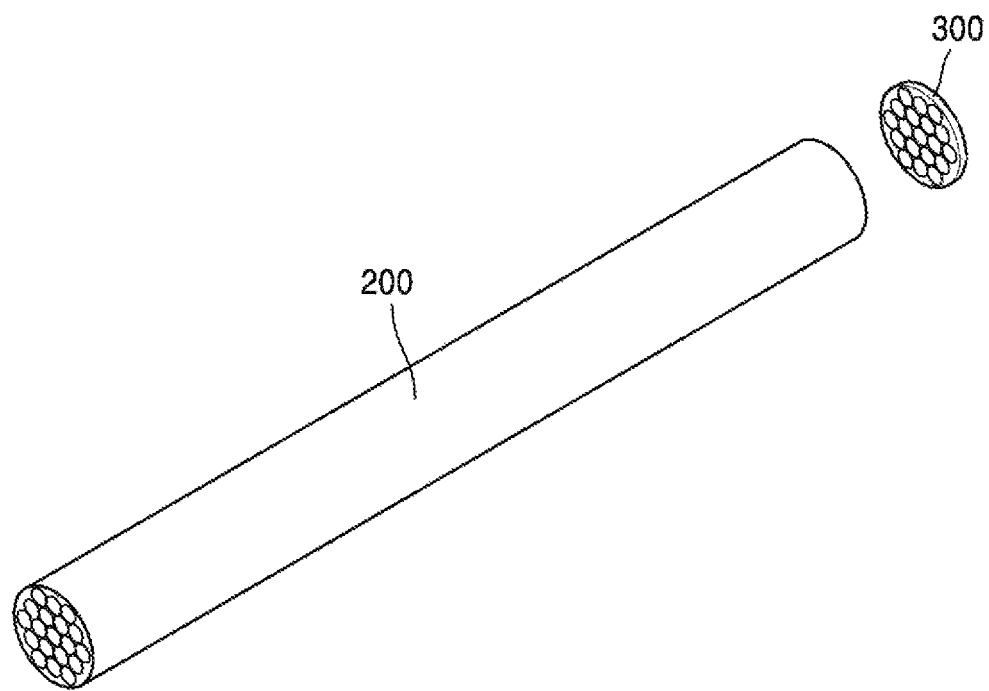

Referring to FIG. 2E, an operation of slicing the stick member 200 may be performed. A color filter substrate 300 may be finally formed by slicing the stick member 200 in a predetermined thickness. The color filter substrate 300 may have the shape of the cross-section of the preform 100. Therefore, the color filter substrate 300 may also have a circular, elliptical, or polygonal shape according to the shape of the preform 100. In one exemplary embodiment, for example, as illustrated in FIG. 2E, when the preform 100 has a circular shape, the color filter substrate 300 may also have a circular shape.

After an operation of slicing the stick member 200, polishing and other processing processes of processing the color filter substrate 300 so that the color filter substrate 300 may be suitable for being applied to a display device may be performed. The color filter substrate 300 that has undergone the polishing and other processing processes may be finally applied to various display devices. The sliced color filter substrate 300 may be processed in various sizes and shapes via the processing processes.

Figure 3:
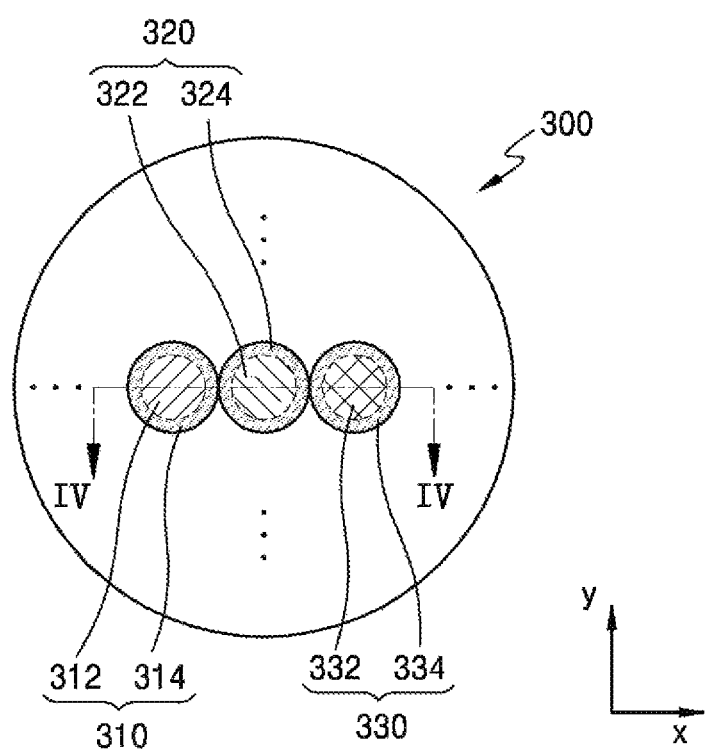
FIG. 3 is a schematic plan view illustrating a color filter substrate according to an exemplary embodiment.
Figure 4:
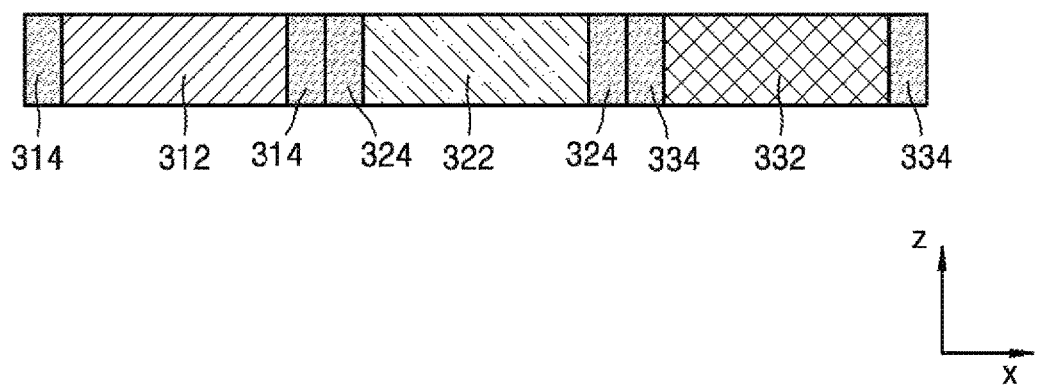
FIG. 4 is a schematic cross-sectional view taken along line IV-IV of the color filter substrate of FIG. 3.

FIG. 3 is a schematic plan view illustrating a color filter substrate 300 according to an exemplary embodiment, and FIG. 4 is a schematic cross-sectional view taken along line IV-IV of the color filter substrate 300 of FIG. 3.

Referring to FIGS. 3 and 4, the color filter substrate 300 may include a plurality of first color filter patterns 310, a plurality of second color filter patterns 320, and a plurality of third color filter patterns 330. The plurality of first color filter patterns 310 may include the same material as those of the first members 110, the plurality of second color filter patterns 320 may include the same material as those of the second members 120, and the plurality of third color filter patterns 330 may include the same material as those of the third members 130. In such an embodiment, a portion of the first member 110 may form the first color filter pattern 310, a portion of the second member 120 may form the second color filter pattern 320, and a portion of the third member 130 may form the third color filter pattern 330.

Referring to FIG. 3, in an exemplary embodiment, each of the plurality of first color filter patterns 310 may have a red color filter 312 at a center thereof and a black matrix 314 surrounding the red color filter 312. In such an embodiment, each of the plurality of second color filter patterns 320 may have a green color filter 322 at a center thereof and a black matrix 324 surrounding the green color filter 322. Also, each of the plurality of third color filter patterns 330 may have a blue color filter 332 at a center thereof and a black matrix 334 surrounding the blue color filter 332.

Referring to FIG. 4, the black matrixes 314, 324 and 334 may be disposed between the plurality of red color filters 312, the plurality of green color filters 322, and the plurality of blue color filters 332. The black matrixes 314, 324 and 334 may include the same material as those of the light-shielding portions 114, 124 and 134 respectively surrounding the cores of the first, second, and third members 110, 120 and 130. In such an embodiment, the light-shielding portions 114, 124 and 134 of the first, second and third members 110, 120 and 130 may be sliced and serve as the black matrixes 314, 324, and 334 of the color filter substrate 300.

In an exemplary embodiment, the color filter patterns 310, 320, and 330 are formed in a circular shape and the color filter substrate 300 having the color filter patterns 310, 320, and 330 is formed in a circular shape as shown in FIG. 3, but the inventive concept is not limited thereto. The shape of the color filter patterns 310, 320, and 330 and the shape of the color filter substrate 300 having the same may be transformed depending on the shape of a display portion and a pixel provided to the display portion.

In an exemplary embodiment, the color filter substrate 300 is formed in a circular shape, and may be suitable for, for example, a display device having a circular display portion such as a clock. According to an exemplary embodiment, the color filter substrate 300 may be efficiently manufactured for a display device having a display portion of various shapes, not a quadrangular display portion in an aspect of a process.

Figure 5A:
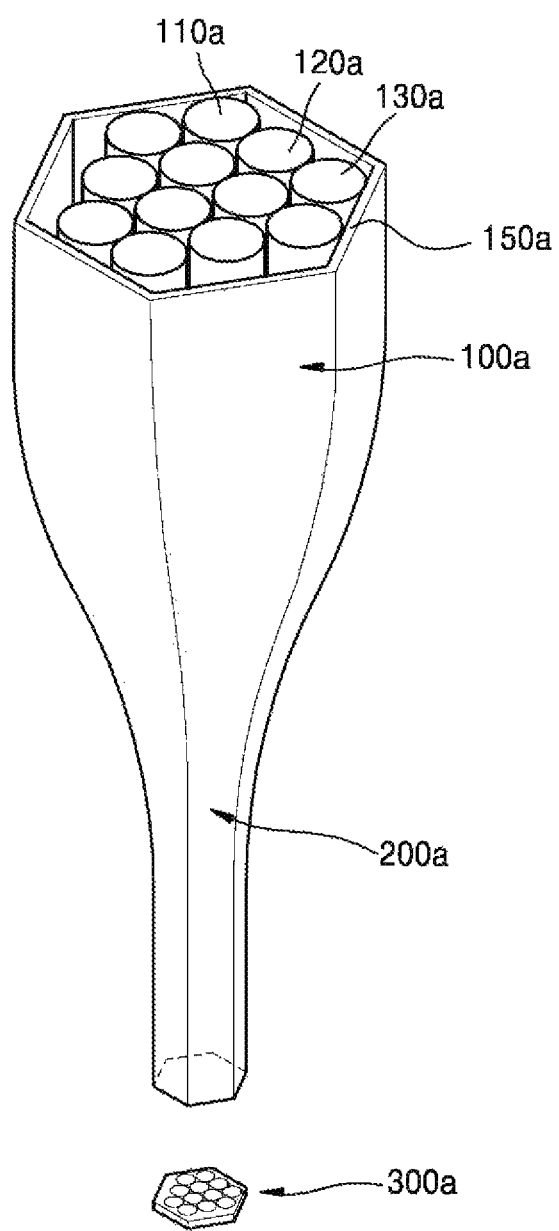
FIGS. 5A and 5B are conceptual diagrams illustrating a preform according to an exemplary embodiment.
Figure 5B:
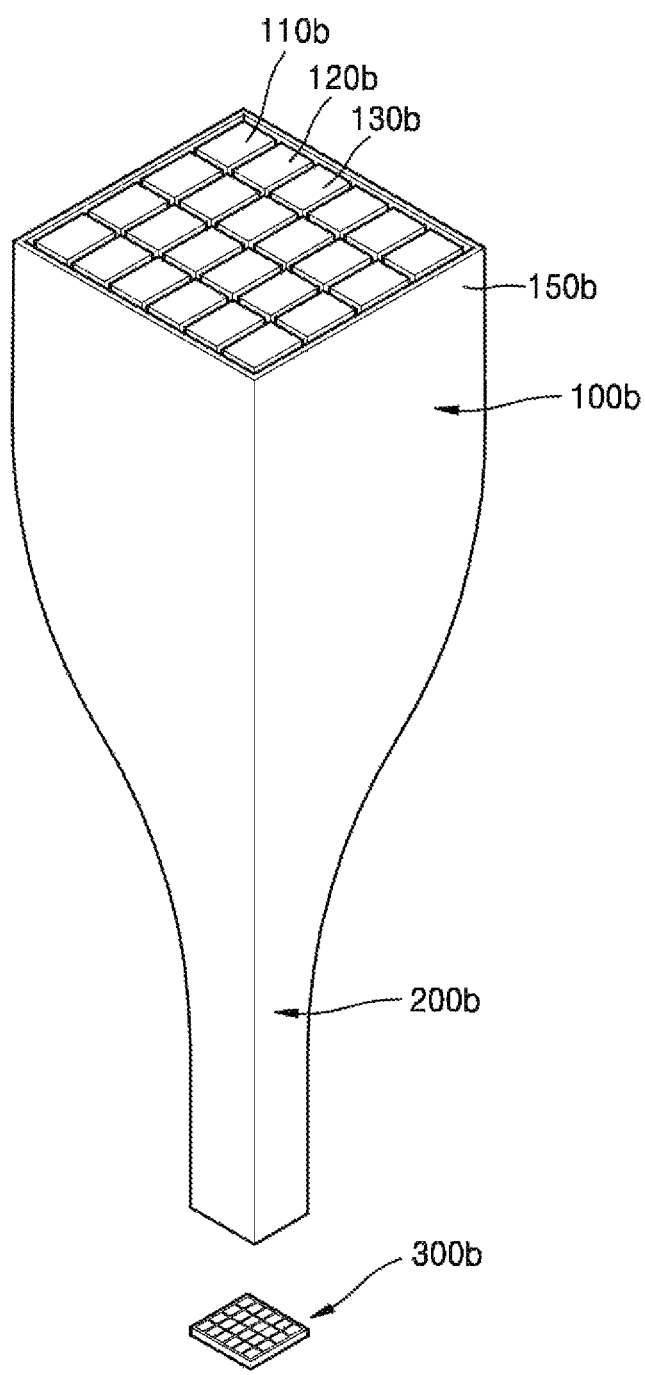

FIGS. 5A and 5B are conceptual diagrams illustrating a preform according to an exemplary embodiment. Referring to FIG. 5A, an exemplary embodiment of a preform 100*a* may have a hexagonal shape. A stick member 200*a* and a color filter substrate 300*a* formed from the preform 100*a* may also have a hexagonal shape like the preform 100*a*. The preform 100*a* may include a plurality of first members 110*a*, a plurality of second members 120*a*, a plurality of third members 130*a*, and a cane 150*a* surrounding the first, second, and third members 110*a*, 120*a*, and 130*a*. In such an embodiment, the first, second and third members 110*a*, 120*a* and 130*a* may have a pillar shape having a circular cross-section. As described above, the shape of the first, second and third members 110*a*, 120*a* and 130*a* may be different from the shape of the cane 150*a* surrounding the first, second and third members 110*a*, 120*a* and 130*a*. In such an embodiment, as described above, the cross-section of the first, second and third members 110*a*, 120*a* and 130*a* is determined by the shape of pixels of the display portion, and the shape of the cane 150*a* is determined by the shape of a display portion or screen. Therefore, such an embodiment is applicable to a hexagonal display portion including circular pixels.

Referring to FIG. 5B, an alternative exemplary embodiment of the preform 100*b* may have a quadrangular shape. A stick member 200*b* and a color filter substrate 300*b* formed from the preform 100*b* may also have a quadrangular shape like the preform 100*b*. The preform 100*b* may include a plurality of first members 110*b*, a plurality of second members 120*b*, a plurality of third members 130*b*, and a cane 150*b* surrounding the first, second, and third members 110*b*, 120*b*, and 130*b*. According to such an embodiment, the first, second and third members 110*b*, 120*b* and 130*b* may have a quadrangular pillar shape having a quadrangular cross-section. As described above, the first, second, and third members 110*b*, 120*b* and 130*b* may have the same shape as the cane 150*b* surrounding the members 110*b*, 120*b* and 130*b*. In such an embodiment, the cross-section of the first, second and third members 110*b*, 120*b*, and 130*b* is determined by the shape of pixels of the display portion, and the shape of the cane 150*b* is determined by the shape of the display portion or screen. Therefore, such an embodiment is applicable to a quadrangular display portion including quadrangular pixels. An exemplary embodiment of a method of manufacturing the color filter substrate 300 has been described above, but the inventive concept is not limited thereto. Another exemplary embodiment is directed to a method of manufacturing a display device that uses the color filter substrate 300 manufactured by the method of manufacturing the color filter substrate 300.

Figure 6:
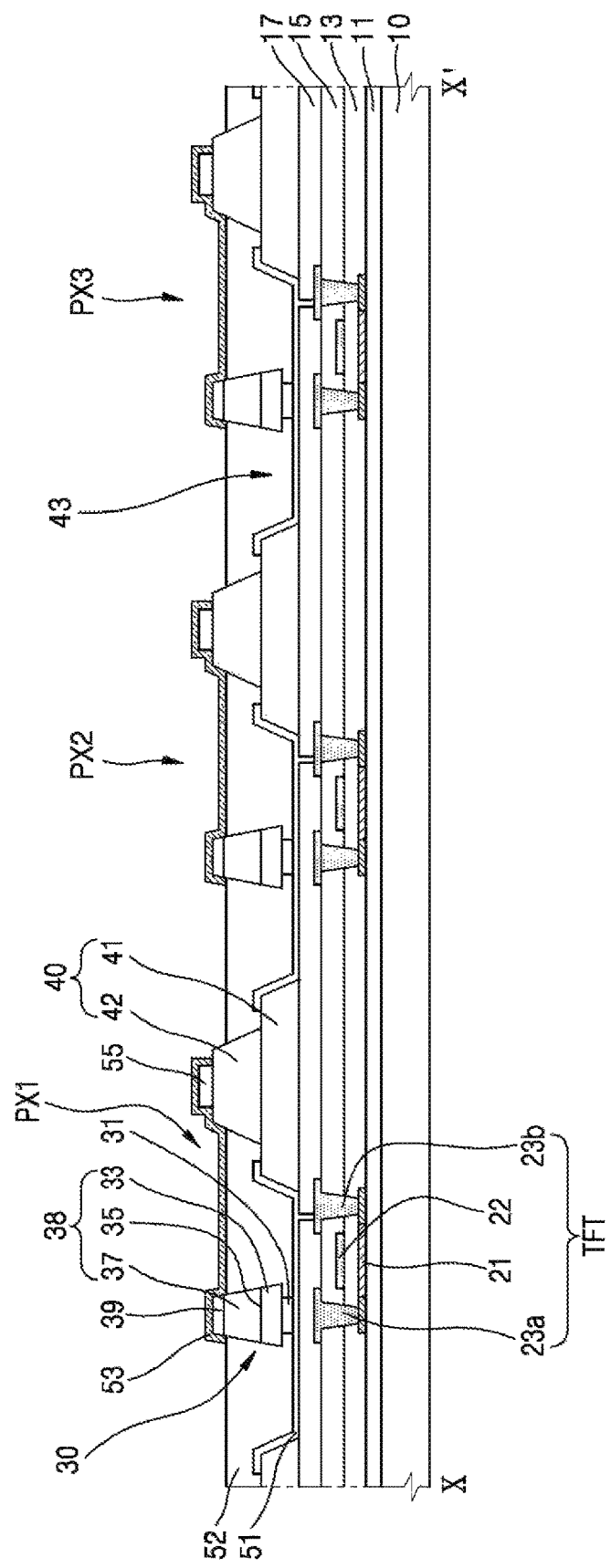
FIGS. 6, 7A, and 7B are schematic cross-sectional views illustrating a method of manufacturing a display device, according to an exemplary embodiment.
Figure 7A:
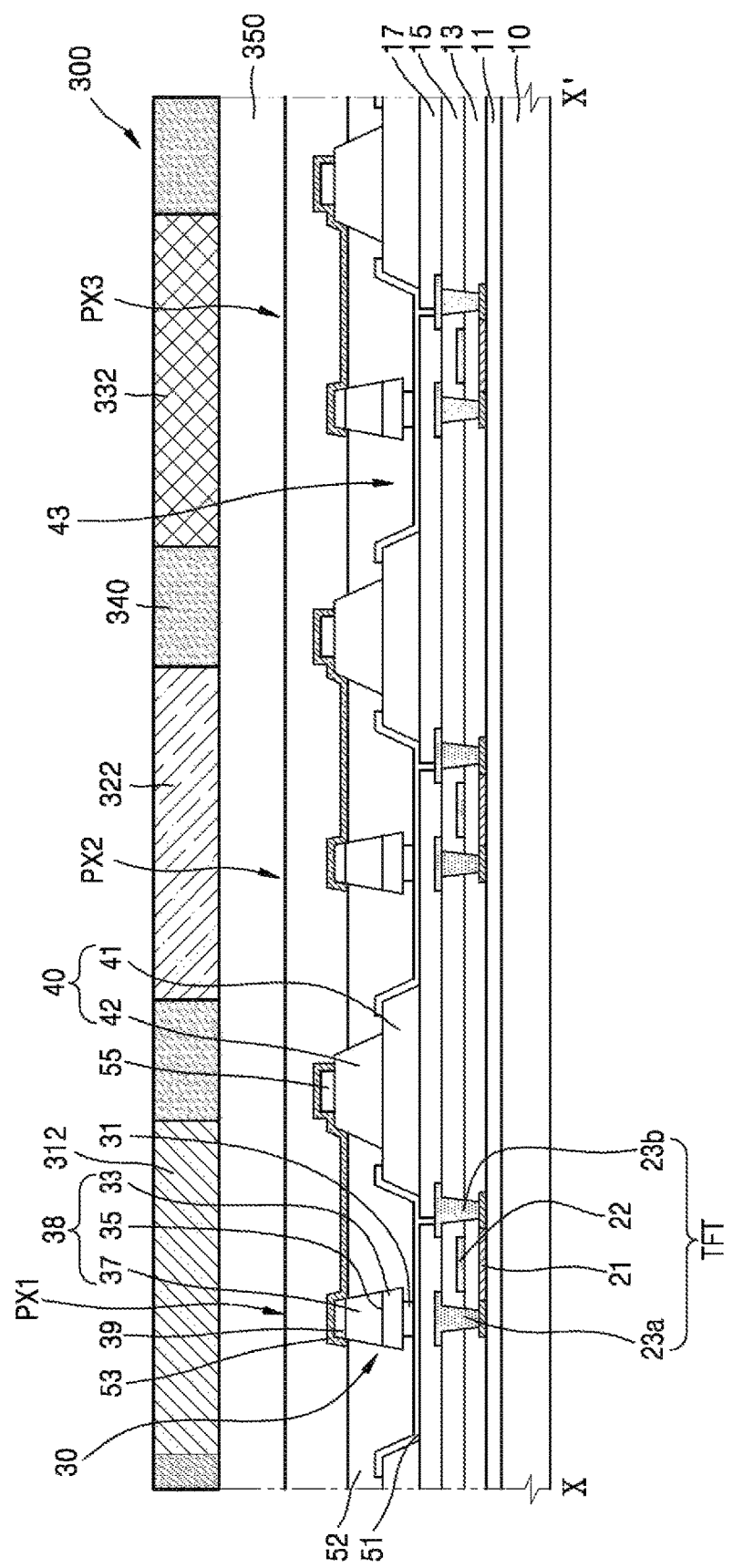
Figure 7B:
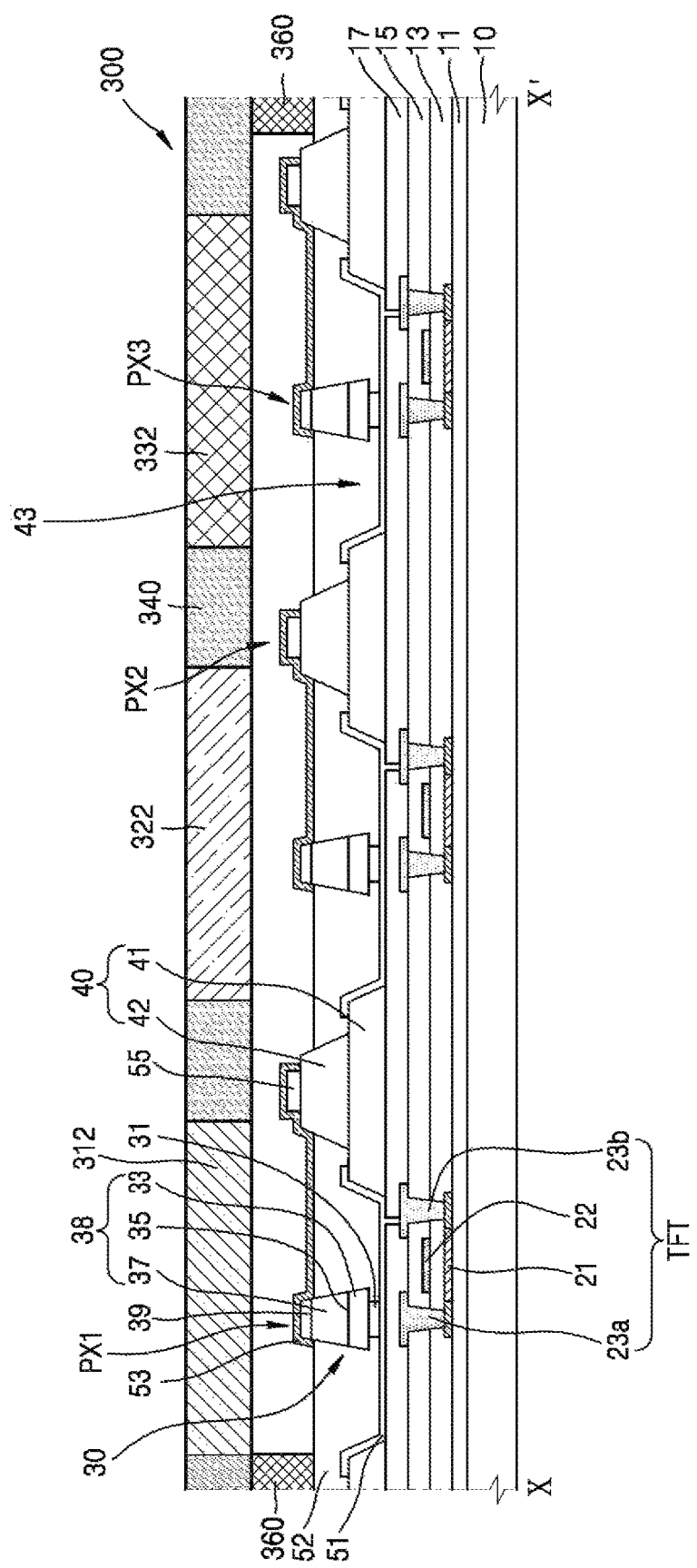

FIGS. 6, 7A, and 7B are schematic cross-sectional views illustrating a method of manufacturing a display device according to an exemplary embodiment.

Referring to FIG. 6, an operation of preparing a substrate 10 including a display area (not shown) and a peripheral area (not shown) around an outer portion of the display area may be performed. An operation of forming a display portion on the substrate 10 may be performed. The color filter substrate 300 manufactured by the above-described manufacturing method is applicable to a display device having the display portion. The display portion may be a liquid crystal display portion, and an organic light-emitting display portion. An exemplary embodiment where a display portion including a light-emitting diode ("LED") will hereinafter be described, for convenience of description, but the invention is not limited thereto.

An operation of forming a display portion may include an operation of forming a buffer layer 11 on the substrate 10. A thin film transistor ("TFT") and a light-emitting diode ("LED") 30 may be formed on the buffer layer 11.

The substrate 10 may include glass or plastic, for example. The buffer layer 11 may effectively prevent penetration of impurity elements via the substrate 10 and planarize the surface of the substrate 10, and include a single layer or a plurality of layers including an inorganic material such as SiNx and/or SiOx.

The TFT may include an active layer 21, a gate electrode 22, a source electrode 23*a* and a drain electrode 23*b*. The active layer 21 may include a semiconductor material, and include a source region, a drain region, and a channel region between the source region and the drain region. The gate electrode 22 is formed on a portion of the active layer 21 that corresponds to the channel region. The source electrode 23*a* and the drain electrode 23*b* are electrically connected with the source region and the drain region of the active layer 21, respectively. A first insulating layer 13 including an inorganic insulating layer is formed as a gate insulating layer between the active layer 21 and the gate electrode 22. A second insulating layer 15 is formed as an interlayer insulating layer between the gate electrode 22 and the source electrode 23*a*/drain electrode 23*b*. A third insulating layer 17 is formed as a planarization layer on the source electrode 23*a*/drain electrode 23*b*. The second insulating layer 15 and the third insulating layer 17 may include an organic insulating layer or an inorganic insulating layer, and include an organic insulating layer and an inorganic insulating layer disposed alternately.

FIG. 6 illustrates an exemplary embodiment of a top gate type TFT in which a gate electrode is disposed above the active layer, but the inventive concept is not limited thereto and the gate electrode may be disposed below the active layer.

A bank layer 40 that defines a pixel region may be disposed on the third insulating layer 17. The bank layer 40 includes a first bank 41 including a concave portion 43 that receives the LED 30. The height of the first bank 41 may be determined by the height of the LED 30 and a viewing angle. A size (e.g., a width) of the concave portion 43 may be determined by resolution or pixel density, for example, of a display device 1. According to an exemplary embodiment, the height of the LED 30 may be greater than the height of the first bank 41.

A first electrode 51 may be formed along the lateral surface and the lower surface of the concave portion 43, and the upper surface of a portion of the first bank 41 that corresponds to a periphery of the concave portion 43. The first electrode 51 is electrically connected with the source electrode 23*a* or the drain electrode 23*b* of the TFT through a via hole formed in the third insulating layer 17. In FIG. 6, the first electrode 51 is electrically connected with the drain electrode 23*b*.

The bank layer 40 may further include a second bank 42 above the first bank 41. The first bank 41 and the second bank 42 have a step difference, and the width of the second bank 42 may be less than the width of the first back 41. The second bank 42 is formed by retreating from the edge of the first bank 41, and may cover or may not cover a portion of the first electrode 51 on the first bank 41.

A conductive layer 55 electrically connected with a second electrode 53 is formed above the second bank 42. In an exemplary embodiment, where the conductive layer 55 is insulated from the first electrode 51, the second bank 42 may be omitted and the conductive layer 55 may be formed on the first bank 41. Alternatively, though not shown, the second bank 42 and the conductive layer 55 may be omitted, and the second electrode 53 may be formed as a common electrode, which is common to pixels P, on the entire substrate 10. The conductive layer 55 may be formed in a direction parallel to a data line or a scan line.

The first bank 41 and the second bank 42 may include a material that absorbs at least a portion of light incident thereto, or a light-reflecting material, or a light-scattering material. The first bank 41 and the second bank 42 may include a semi-transparent or opaque insulating material with respect to visible light (for example, light in the wavelength ranging from about 380 nm to about 750 nm). The first bank 41 and the second bank 42 may include a thermo-plastic resin such as PC, polyethylene terephthalate ("PET"), polyether sulfone ("PES"), polyvinyl butyral ("PVB"), polyphenylene ether ("PPE"), polyamide, polyetherimide ("PEI"), a norbornene-based resin, a methacrylic resin, a cyclic polyolefin-based resin, etc., a thermosetting resin such as an epoxy resin, a phenolic resin, a urethane resin, an acrylic resin, a vinyl ester resin, an imide-based resin, a urethane-based resin, a urea resin, a melamine resin, etc., or an organic insulating material such as polystyrene, polyacrylonitrile, polycarbonate, etc., but is not limited thereto. The first bank 41 and the second bank 42 may include an inorganic insulating material including an inorganic oxide and an inorganic nitride such as SiOx, SiNx, SiNxOy, AlOx, TiOx, TaOx, ZnOx, etc., but is not limited thereto. According to an exemplary embodiment, the first bank 41 and the second bank 42 may include an opaque material such as a black matrix 340 (see FIG. 7A or 7B). According to an alternative exemplary embodiment, the first bank 41 and the second bank 42 may be a distributed-Brag reflector ("DBR") having high reflectivity or a mirror reflector including metal.

The LED 30 is formed in the concave portion 43 of the first bank 41. The LED 30 may be a micro LED. Here, micro may indicate a size in a range of about 1 micrometer (μm) to about 100 μm, but exemplary embodiments are not limited thereto and may be applied to an LED of a larger size or a smaller size. The LED 30 or a plurality of LEDs 30 may be individually or collectively picked up from a wafer and transferred by a transfer mechanism, so that the LED 30 may be received in the concave portion 43 of the substrate 10. According to an exemplary embodiment, the LED 30 may be received in the concave portion 43 of the substrate 10 after the first bank 41 and the first electrode 51 are formed. According to an alternative exemplary embodiment, after the second bank 42 and the conductive layer 55 are additionally formed, the LED 30 may be transferred to the substrate 10, so that the LED 30 may be received in the concave portion 43 of the substrate 10. The LED 30 may be a red, green, blue, white, or ultraviolet ("UV") LED.

The LED 30 may include a p-n diode 38, a first contact electrode 31, and a second contact electrode 39. The first contact electrode 31 and/or the second contact electrode 39 may include one or more layers, and may include various conductive materials including metal, a conductive oxide, and conductive polymers. The first contact electrode 31 and the second contact electrode 39 may selectively include a reflective layer, for example, a silver layer. The first contact electrode 31 is electrically connected with the first electrode 51, and the second contact electrode 39 is electrically connected with the second electrode 53. The p-n diode 38 may include a lower p-doped layer 33, one or more quantum well layers 35, and an upper n-doped layer 37. According to another exemplary embodiment, the upper doped layer 37 may be a p-doped layer, and the lower doped layer 33 may be an n-doped layer. The p-n diode 38 may have a straight line type lateral wall, or a lateral wall tapered from up to down, or down to up.

The first electrode 51 may include a reflective electrode and include one or more layers. In one exemplary embodiment, for example, the first electrode 51 may include metal such as aluminum, molybdenum, titanium, an alloy of titanium and tungsten, silver or gold, or an alloy thereof. The first electrode 51 may include a transparent conductive layer including a conductive material such as a transparent conductive oxide ("TCO") including indium tin oxide ("ITO"), indium zinc oxide ("IZO"), ZnO, or $In_2O_3$, etc., a carbon nano tube film, or a transparent conductive polymer, and a reflective layer. According to an exemplary embodiment, the first electrode 51 may be a triple layer including upper and lower transparent conductive layers and a reflective layer therebetween. The second electrode 53 may include a transparent or semitransparent electrode. In one exemplary embodiment, for example, the second electrode 53 may include the above-described transparent conductive material, and include at least one selected from Ag, Al, Mg, Li, Ca, Cu, LiF/Ca, LiF/Al, MgAg, and CaAg.

A passivation layer 52 surrounds the LED 30 inside the concave portion 43. The passivation layer 52 covers the concave portion 43 and the first electrode 51 by filling a space between the bank layer 40 and the LED 30. The passivation layer 52 may include an organic insulating layer. In one exemplary embodiment, for example, the passivation layer may include acryl, PMMA, benzocyclobutene ("BCB"), polyimide, acrylate, epoxy, polyester, etc., but is not limited thereto. The passivation layer 52 has a height that does not cover the upper portion of the LED 30, for example, the second contact electrode 39, so that the second contact electrode 39 is exposed. The exposed second contact electrode 39 of the LED 30 and the second electrode 53 electrically connected with the conductive layer 55 are formed above the passivation layer 52.

Though FIG. 6 illustrates an exemplary embodiment including a vertical micro LED, but exemplary embodiments are not limited thereto and a flip type micro LED in which the first contact electrode and the second contact electrode are disposed in the same direction, a horizontal micro LED, etc. may be used. In such an embodiment, the first electrode and the second electrode may be disposed to correspond to the positions of the first contact electrode and the second contact electrode.

Next, referring to FIG. 7A, an operation of disposing the color filter substrate 300 on the display portion to face the substrate 10 with the display portion disposed therebetween may be performed. In an exemplary embodiment, an operation of disposing the color filter substrate 300 on the display portion may include an operation of bonding the color filter substrate 300 and the display portion with a transparent adhesive layer 350 entirely disposed between the color filter substrate 300 and the display portion. The transparent adhesive layer 350 may include, for example, an optical clear adhesive ("OCA") or an optical clear resin ("OCR").

According to an alternative exemplary embodiment, referring to FIG. 7B, an operation of disposing the color filter substrate 300 on the display portion to face the substrate 10 with the display portion disposed therebetween may be performed. In such an embodiment, an operation of disposing the color filter substrate 300 on the display portion may include an operation of bonding the color filter substrate 300 and the display portion by forming a sealing member 360 on a peripheral area of the substrate 10. In such an embodiment, after vacuum-bonding the display portion and the color filter substrate 300, the sealing member 360 may be formed on only the border.

Referring to FIGS. 7A and 7B, the color filter substrate 300 may include a red color filter 312, a green color filter 322, and a blue color filter 332. The red color filter 312 may include the same material as that of the first core 112 of the first member 110, the green color filter 322 may include the same material as that of the second core 122 of the second member 120, and the blue color filter 332 may include the same material as that of the third core 132 of the third member 130.

The display portion may include a plurality of first pixels PX1, a plurality of second pixels PX2, and a plurality of third pixels PX3. The first pixels PX1 may be disposed to respectively correspond to the red color filter patterns 310, the second pixels PX2 may be disposed to respectively correspond to the green color filter patterns 320, and the third pixels PX3 may be disposed to respectively correspond to the blue color filter patterns 330.

The black matrix 340 may be disposed between the color filter patterns 310, 320, and 330, and may correspond to the positions at which the first bank 41 and the second bank 42 are formed. The insulating black matrix 340 may include an organic resin, glass paste, and a resin including a black pigment, or paste, a metallic particle, for example, nickel, aluminum, molybdenum, and an alloy thereof, a metallic oxide particle (for example, a chrome oxide), or a metallic nitride particle (for example, a chrome nitride), etc.

Though the inventive concept has been described with reference to exemplary embodiments illustrated in the drawings, these are provided for an exemplary purpose only, and those of ordinary skill in the art will understand that various modifications and other equivalent embodiments may be made therein. Therefore, the spirit and scope of the inventive concept should be defined by the following claims.

What is claimed is:

1. A method of manufacturing a color filter substrate, the method comprising:
   forming a plurality of first members, a plurality of second members, and a plurality of third members, wherein each of the first members, the second members and the third members has a pillar shape extending in a direction;
   stacking the first members, the second members and the third members on one another;
   forming a preform by inserting the stacked first members, second members and third members into a cane;
   forming a stick member from the preform comprising the stacked first members, second members, third members and the cane via a drawing process by applying heat to the preform inserted into the cane; and
   slicing the stick member,
   wherein the cane comprises a same material as a material of the first members, the second members and the third members.

2. The method of claim 1, wherein each of the first members, the second members and the third members comprises a glass material.

3. The method of claim 1, wherein each of the first members, the second members and the third members comprises a plastic material.

4. The method of claim 1, wherein
   each of the first members comprises a first core having a first color at a center thereof and a first light-shielding portion surrounding the first core,
   each of the second members comprises a second core having a second color at a center thereof and a second light-shielding portion surrounding the second core, and
   each of the third members comprises a third core having a third color at a center thereof and a third light-shielding portion surrounding the third core.

5. The method of claim 4, wherein
   the first color is a red color,
   the second color is a green color, and
   the third color is a blue color.

6. The method of claim 1, wherein the forming the first members, the second members and the third members comprises:
   forming each of the first members, the second members and the third members via a drawing process.

7. The method of claim 1, wherein the first members, the second members and the third members in the preform are regularly arranged.

8. The method of claim 1, wherein each of the first members, the second members and the third members has a circular, elliptical, or polygonal cross-section.

9. The method of claim 1, wherein the preform has a circular, elliptical, or polygonal cross-section.

10. The method of claim 9, wherein the cane has a circular, elliptical, or polygonal cross-section corresponding to a shape of the preform.

11. The method of claim 1, wherein the first members, the second members, the third members and the cane have a same coefficient of thermal expansion as each other.

12. The method of claim 1, wherein the forming the stick member comprises:
   reducing a cross-section of the preform by a predetermined degree by extending the preform in a direction.

13. The method of claim 1, wherein the color filter substrate has a circular, elliptical or polygonal shape.

14. A method of manufacturing a display device, the method comprising:
   manufacturing the color filter substrate using the method of claim 1;
   preparing a substrate on which a display area and a peripheral area around the display area are defined;
   providing a display portion in the display area of the substrate; and
   disposing the color filter substrate on the substrate in a way such that the color filter substrate faces the substrate with the display portion disposed therebetween.

15. The method of claim 14, wherein the disposing the color filter substrate comprises:
   bonding the color filter substrate and the display portion together with a transparent adhesive layer disposed between the color filter substrate and the display portion.

16. The method of claim 15, wherein the disposing the color filter substrate comprises:
   bonding the color filter substrate and the display portion together by providing a sealing member therebetween in the peripheral area.

17. The method of claim 14, wherein
   the color filter substrate comprises a plurality of red color filters, a plurality of green color filters and a plurality of blue color filters,
   the red color filters comprise a same material as a material of the first cores, the green color filters comprise a same material as a material of the second cores, and the blue color filters comprise a same material as a material of the third cores.

18. The method of claim 17, wherein the display portion comprises a plurality of first pixels, a plurality of second pixels, and a plurality of third pixels, the first pixels respectively correspond to the red color filters, the second pixels respectively correspond to the green color filters, and the third pixels respectively correspond to the blue color filters.

19. The method of claim 14, wherein a black matrix is disposed between the red color filters, the green color filters and the blue color filters, and the black matrix comprises a same material as a material of a light-shielding portion.

20. The method of claim 14, wherein the display portion has a same shape as the color filter substrate.

\* \* \* \* \*